(12) United States Patent
Xuan et al.

(10) Patent No.: US 12,549,274 B2
(45) Date of Patent: Feb. 10, 2026

(54) COMMUNICATION METHOD AND COMMUNICATION APPARATUS

(71) Applicant: HUAWEI TECHNOLOGIES CO., LTD., Guangdong (CN)

(72) Inventors: Yidi Xuan, Beijing (CN); Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 18/647,037

(22) Filed: Apr. 26, 2024

(65) Prior Publication Data

US 2024/0275515 A1   Aug. 15, 2024

Related U.S. Application Data

(63) Continuation of application No. PCT/CN2022/126322, filed on Oct. 20, 2022.

(30) Foreign Application Priority Data

Oct. 29, 2021  (CN) .......................... 202111274087.8

(51) Int. Cl.
*H04L 1/00* (2006.01)
*H04L 27/34* (2006.01)

(52) U.S. Cl.
CPC ............ *H04L 1/0003* (2013.01); *H04L 27/34* (2013.01)

(58) Field of Classification Search
CPC ... H04L 1/0003; H04L 1/0009; H04L 1/0016; H04L 1/0025; H04L 27/34
See application file for complete search history.

(56) References Cited

U.S. PATENT DOCUMENTS

| | | | |
|---|---|---|---|
| 11,115,098 B2* | 9/2021 | Islam | H04L 1/0003 |
| 11,785,630 B1* | 10/2023 | Tuli | H04L 1/0003 370/336 |
| 2013/0254617 A1* | 9/2013 | Shinohara | H03M 13/2906 714/752 |
| 2016/0036618 A1* | 2/2016 | Einhaus | H04L 1/0029 370/329 |
| 2017/0223686 A1* | 8/2017 | You | H04L 5/005 |
| 2018/0124754 A1* | 5/2018 | Sun | H04L 5/0055 |
| 2018/0205488 A1* | 7/2018 | Rico Alvarino | H04L 27/00 |
| 2018/0351625 A1* | 12/2018 | Xu | H04L 5/0057 |
| 2019/0104011 A1 | 4/2019 | Yang et al. | |
| 2019/0132824 A1 | 5/2019 | Jeon et al. | |
| 2019/0379511 A1* | 12/2019 | Xu | H04L 5/0046 |

(Continued)

FOREIGN PATENT DOCUMENTS

CN   110460409 A   11/2019

OTHER PUBLICATIONS

International Search Report and Written Opinion issued in PCT/CN2022/126322, dated Dec. 15, 2022, 9 pages.

*Primary Examiner* — Dung B Huynh

(57) ABSTRACT

A communication method includes: receiving first information, wherein the first information indicates a first modulation and coding scheme, the first modulation and coding scheme is one of N modulation and coding schemes, the N modulation and coding schemes comprise at least one modulation and coding scheme whose modulation order is 12, and N is a positive integer, and receiving or sending data based on the first modulation and coding scheme.

14 Claims, 3 Drawing Sheets

(56) References Cited

U.S. PATENT DOCUMENTS

| | | | |
|---|---|---|---|
| 2019/0386867 A1* | 12/2019 | Liu | H04L 27/0008 |
| 2020/0128529 A1* | 4/2020 | Wang | H04L 5/0091 |
| 2020/0213056 A1* | 7/2020 | Chen | H04L 5/0053 |
| 2020/0287657 A1* | 9/2020 | Marinier | H04L 1/0016 |
| 2020/0366352 A1* | 11/2020 | Si | H04W 80/08 |
| 2020/0389239 A1* | 12/2020 | Garcia | H04L 1/0009 |
| 2021/0050930 A1* | 2/2021 | Li | H03M 13/116 |
| 2021/0050938 A1* | 2/2021 | Sarkis | H04L 1/0009 |
| 2021/0083730 A1* | 3/2021 | Hwang | H04B 7/0408 |
| 2021/0273759 A1* | 9/2021 | Maki | H04L 1/0003 |
| 2022/0021474 A1* | 1/2022 | Yang | H04L 1/0009 |
| 2022/0123856 A1* | 4/2022 | Levitsky | H04L 27/2646 |
| 2022/0352902 A1* | 11/2022 | Jeong | H03M 13/271 |
| 2022/0377706 A1* | 11/2022 | Kittichokechai | H04L 5/0094 |
| 2022/0400512 A1* | 12/2022 | Myung | H04L 1/0007 |
| 2023/0064653 A1* | 3/2023 | Elshafie | H04L 1/0003 |
| 2023/0065810 A1* | 3/2023 | Elshafie | H04L 1/0025 |
| 2023/0114410 A1* | 4/2023 | Jang | H04L 1/0016 370/329 |
| 2023/0198655 A1* | 6/2023 | Yoon | H04L 1/0016 370/329 |
| 2023/0198702 A1* | 6/2023 | Kim | H04L 27/2601 370/329 |
| 2023/0216603 A1* | 7/2023 | Bian | H04L 1/0016 370/329 |
| 2023/0254061 A1* | 8/2023 | Ruan | H04L 1/0003 370/329 |
| 2023/0261780 A1* | 8/2023 | Xie | H04L 1/0003 |
| 2023/0283429 A1* | 9/2023 | Park | H04L 1/1854 370/329 |
| 2023/0344549 A1* | 10/2023 | Yao | H04L 1/0003 |
| 2023/0370195 A1* | 11/2023 | Yeo | H04W 4/50 |
| 2024/0106508 A1* | 3/2024 | Tang | H04L 1/0029 |
| 2024/0267933 A1* | 8/2024 | Lee | H04W 72/04 |
| 2024/0388348 A1* | 11/2024 | Islam | H04L 1/0026 |
| 2024/0388378 A1* | 11/2024 | Myung | H04L 27/34 |

* cited by examiner

COMMUNICATION METHOD AND COMMUNICATION APPARATUS

CROSS-REFERENCE TO RELATED APPLICATIONS

This application is a continuation of International Application No. PCT/CN2022/126322, filed on Oct. 20, 2022, which claims priority to Chinese Patent Application No. 202111274087.8, filed on Oct. 29, 2021. The disclosures of the aforementioned applications are hereby incorporated by reference in their entireties.

TECHNICAL FIELD

Embodiments of this disclosure relate to the communication field, and more specifically, to a communication method and a communication apparatus.

BACKGROUND

In a wireless communication system, factors such as a distance and/or an environment between a base station and a terminal device affect a status of a wireless channel. For example, when the distance between the base station and the terminal device is shorter and there are fewer obstacles between the base station and the terminal device, quality of the wireless channel between the base station and the terminal device is better. When the distance between the base station and the terminal device is longer and there are more obstacles between the base station and the terminal device, quality of the wireless channel between the base station and the terminal device is poorer.

To meet communication requirements of different terminal devices or match different quality of wireless channels, a new radio (NR) interface system supports a plurality of modulation and coding schemes (MCSs). Different MCSs correspond to different modulation orders and/or code rates. Modulation techniques in the MCSs include quadrature phase shift keying (QPSK) modulation and quadrature amplitude modulation (QAM).

A highest modulation order supported by an existing NR system is 10, namely, 1024-QAM. For a terminal with better channel quality, for example, a terminal in a cell center at an extremely low moving speed, communication efficiency needs to be urgently improved.

SUMMARY

Embodiments of this disclosure provide a communication method and a communication apparatus. A corresponding MCS for 4096-QAM is predefined or flexibly configured, so that a terminal with better channel quality can obtain higher communication efficiency.

According to a first aspect, a communication method is provided. The method may be performed by a terminal device, or may be performed by a component (for example, a chip or a circuit) of a terminal device. This is not limited. For ease of description, the following uses an example in which the method is performed by the terminal device for description.

The method may include: The terminal device determines a first modulation and coding scheme from N modulation and coding schemes, where the N modulation and coding schemes include at least one modulation and coding scheme whose modulation order is 12, and N is a positive integer; and the terminal device sends first information, where the first information indicates the first modulation and coding scheme.

In the foregoing technical solution, it is predefined that the N modulation and coding schemes include at least one corresponding MCS for 4096-QAM. The terminal device determines the first modulation and coding scheme from the N modulation and coding schemes based on the first information, to meet a requirement of using 4096-QAM in a communication system, so that the terminal with better channel quality can obtain higher communication efficiency.

According to a second aspect, a communication method is provided. The method may be performed by a network device, or may be performed by a component (for example, a chip or a circuit) of a network device. This is not limited. For ease of description, the following uses an example in which the method is performed by the network device for description.

The method may include: The network device receives first information, where the first information indicates a first modulation and coding scheme, the first modulation and coding scheme is one of N modulation and coding schemes, the N modulation and coding schemes include at least one modulation and coding scheme whose modulation order is 12, and N is a positive integer; and the network device receives or sends data based on the first modulation and coding scheme.

In the technical solution of the first aspect or the second aspect, it is predefined that the N modulation and coding schemes include at least one corresponding MCS for 4096-QAM. The network device indicates, by using the first information, the terminal device to determine the first modulation and coding scheme from the N predefined modulation and coding schemes, to meet a requirement that the network device and the terminal device use 4096-QAM in the communication system.

With reference to the first aspect or the second aspect, each of the N modulation and coding schemes corresponds to one modulation order and one code rate.

With reference to the first aspect or the second aspect, a quantity of the at least one modulation and coding scheme whose modulation order is 12 in the N modulation and coding schemes is 4, 5, or 6.

For example, the quantity of the at least one modulation and coding scheme whose modulation order is 12 is 4, and code rates corresponding to the four modulation and coding schemes whose modulation orders are 12 are 829.5/1024, 869/1024, 908.5/1024, and 948/1024; the quantity of the at least one modulation and coding scheme whose modulation order is 12 is 5, and code rates corresponding to the five modulation and coding schemes whose modulation orders are 12 are 821.5/1024, 853/1024, 884.5/1024, 916.5/1024, and 948/1024; or the quantity of the at least one modulation and coding scheme whose modulation order is 12 is 6, and code rates corresponding to the six modulation and coding schemes whose modulation orders are 12 are 816.5/1024, 842.5/1024, 869/1024, 895.5/1024, 921.5/1024, and 948/1024.

In a design manner in which the code rates corresponding to the four modulation and coding schemes whose modulation orders are 12 are 829.5/1024, 869/1024, 908.5/1024, and 948/1024, it can be found through simulation verification that, on an additive white gaussian noise channel, a 10% BLER-SNR interval corresponding to modulation and coding schemes whose modulation orders are 10 (1024-QAM) (for example, code rates corresponding to the modulation and coding schemes whose modulation orders are 10 are 805.5/1024, 853/1024, 900.5/1024, and 948/1024) is basically equal to a 10% BLER-SNR interval corresponding to the four modulation and coding schemes whose modulation and coding orders are 12. This facilitates link adaptation by a wireless communication system. The 10% BLER-SNR is a signal-to-noise ratio corresponding to a case in which a block error rate is equal to 10%. In addition, the quantity of modulation and coding schemes whose modulation orders are 12 is an even number, which simplifies a design of a channel quality indicator table. The modulation and coding schemes whose modulation orders are 12 in an MCS table may be selected at equal intervals as entries in the channel quality indicator table. For example, two MCSs whose modulation orders are 12 and code rates are 829.5/1024 and 908.5/1024 may be selected as the entries in the CQI table, or two MCSs whose modulation orders are 12 and code rates are 869/1024 and 948/1024 may be selected as the entries in the CQI table.

In a design manner in which the code rates corresponding to the six modulation and coding schemes whose modulation orders are 12 are 816.5/1024, 842.5/1024, 869/1024, 895.5/1024, 921.5/1024, and 948/1024, a spectral efficiency interval corresponding to modulation and coding schemes whose modulation orders are 10 (1024-QAM) (for example, code rates corresponding to the modulation and coding schemes whose modulation orders are 10 are 805.5/1024, 853/1024, 900.5/1024, and 948/1024) is basically equal to a spectral efficiency interval corresponding to the six modulation and coding schemes whose modulation and coding orders are 12. This facilitates link adaptation by a wireless communication system, to overcome or adapt to impact caused by a current channel change. In addition, the quantity of modulation and coding schemes whose modulation orders are 12 is an even number, which simplifies a design of a CQI table, and modulation and coding schemes whose modulation orders are 12 in an MCS table may be selected at equal intervals as entries in the CQI table. For example, three MCSs whose modulation orders are 12 and code rates are 816.5/1024, 869/1024, and 921.5/1024 may be selected as entries in the CQI table, or three MCSs whose modulation orders are 12 and code rates are 842.5/1024, 895.5/1024, and 948/1024 may be selected as entries in the CQI table.

It should be understood that channel quality is good for a potential application scenario in which 4096-QAM can be used. For example, in a fixed wireless access scenario, a CPE device is fixedly installed, a channel changes slowly and stably, and a plurality of downlink receive antennas are configured for the CPE device. In this way, a probability that low-order modulation (for example, QPSK or 16-QAM) is configured for the terminal is low. Therefore, the N modulation and coding schemes may include a small quantity of modulation and coding schemes with low modulation orders.

With reference to the first aspect and the second aspect, the N modulation and coding schemes do not include a modulation and coding scheme whose modulation order is 2.

With reference to the first aspect and the second aspect, a quantity of modulation and coding schemes whose modulation orders are 2 in the N modulation and coding schemes is 1. For example, a code rate corresponding to the modulation and coding scheme whose modulation order is 2 is 120/1024 or 193/1024.

With reference to the first aspect and the second aspect, the N modulation and coding schemes do not include a modulation and coding scheme whose modulation order is 4.

With reference to the first aspect and the second aspect, a quantity of modulation and coding schemes whose modulation orders are 4 in the N modulation and coding schemes is 1. For example, a code rate corresponding to the modulation and coding scheme whose modulation order is 4 is 378/1024 or 490/1024.

With reference to the first aspect and the second aspect, the N modulation and coding schemes include at least one modulation and coding scheme in a first modulation and coding scheme set and/or at least one modulation and coding scheme in a second modulation and coding scheme set. A highest modulation order of the modulation and coding schemes in the first modulation and coding scheme set and the second modulation and coding scheme set is 6, 8, or 10.

According to a third aspect, a communication method is provided. The method may be performed by a terminal device, or may be performed by a component (for example, a chip or a circuit) of a terminal device. This is not limited. For ease of description, the following uses an example in which the method is performed by the terminal device for description.

The method may include: The terminal device receives first signaling, where the first signaling is used to configure N modulation and coding schemes, and N is a positive integer: the terminal device receives first information, where the first information indicates a first modulation and coding scheme, and the first modulation and coding scheme is one of the N modulation and coding schemes; and the terminal device determines the first modulation and coding scheme based on the first information.

In the foregoing technical solution, a network device can flexibly configure, based on communication requirements of different terminal devices, the N modulation and coding schemes by using the first signaling, to avoid a problem that a predefined modulation and coding scheme cannot match an actual transmission status of the terminal device.

With reference to the third aspect, in some implementations of the third aspect, the N modulation and coding schemes include at least one modulation and coding scheme whose modulation order is 12.

In the foregoing technical solution, a requirement that the network device and the terminal device use 4096-QAM in a communication system can be implemented.

With reference to the third aspect, in some implementations of the third aspect, the first signaling includes second information and third information. The second information indicates M modulation and coding schemes. The third information indicates L modulation and coding schemes. M and L are positive integers. The method further includes: The terminal device receives second signaling. The second signaling indicates a first modulation and coding scheme set. The first modulation and coding scheme set includes the L modulation and coding schemes, but does not include the M modulation and coding schemes. That the terminal device determines the first modulation and coding scheme from the N modulation and coding schemes based on the first information includes: The terminal device determines the first modulation and coding scheme based on the first signaling, the second signaling, and the first information.

With reference to the third aspect, in some implementations of the third aspect, that the terminal device determines the first modulation and coding scheme based on the first signaling, the second signaling, and the first information includes: The terminal device determines the N modulation and coding schemes based on the first signaling and the second signaling, where the N modulation and coding schemes include a modulation and coding scheme other than the L modulation and coding schemes in the first modulation and coding scheme set and the M modulation and coding schemes, and determines the first modulation and coding scheme from the N modulation and coding schemes based on the first information.

With reference to the third aspect, in some implementations of the third aspect, the first modulation and coding scheme set is a predefined modulation and coding scheme set. A highest modulation order of a modulation and coding scheme in the first modulation and coding scheme set is 6, 8, or 10. The M modulation and coding schemes include at least one modulation and coding scheme whose modulation and coding order is 12.

With reference to the third aspect, in some implementations of the third aspect, the N modulation and coding schemes include at least one modulation and coding scheme in a second modulation and coding scheme set and/or at least one modulation and coding scheme in a third modulation and coding scheme set.

With reference to the third aspect, in some implementations of the third aspect, intervals between spectral efficiency corresponding to any two adjacent modulation and coding schemes in the N modulation and coding schemes are equal. The spectral efficiency is a product of a modulation order corresponding to a modulation and coding scheme and a code rate.

According to a fourth aspect, a communication method is provided. The method may be performed by a network device, or may be performed by a component (for example, a chip or a circuit) of a network device. This is not limited. For ease of description, the following uses an example in which the method is performed by the network device for description.

The method may include: The network device sends first signaling, where the first signaling is used to configure N modulation and coding schemes, and N is a positive integer; and the network device sends first information, where the first information indicates a first modulation and coding scheme in the N modulation and coding schemes.

With reference to the fourth aspect, in some implementations of the fourth aspect, the N modulation and coding schemes include at least one modulation and coding scheme whose modulation order is 12.

With reference to the fourth aspect, in some implementations of the fourth aspect, the first signaling includes second information and third information. The second information indicates M modulation and coding schemes. The third information indicates L modulation and coding schemes. The method further includes: The network device sends second signaling. The second signaling indicates a first modulation and coding scheme set. The first modulation and coding scheme set includes the L modulation and coding schemes, but does not include the M modulation and coding schemes. M and L are natural numbers.

With reference to the fourth aspect, in some implementations of the fourth aspect, the first modulation and coding scheme set is a predefined modulation and coding scheme set. A highest modulation order of a modulation and coding scheme in the first modulation and coding scheme set is 6, 8, or 10. The M modulation and coding schemes include at least one modulation and coding scheme whose modulation and coding order is 12.

With reference to the fourth aspect, in some implementations of the fourth aspect, the N modulation and coding schemes include at least one modulation and coding scheme in a second modulation and coding scheme set and/or at least one modulation and coding scheme in a third modulation and coding scheme set. Highest modulation orders of the modulation and coding schemes in the second modulation and coding scheme set and the third modulation and coding scheme set are different.

With reference to the fourth aspect, in some implementations of the fourth aspect, intervals between spectral efficiency corresponding to any two adjacent modulation and coding schemes in the N modulation and coding schemes are equal. The spectral efficiency is a product of a modulation order corresponding to a modulation and coding scheme and a code rate.

According to a fifth aspect, a communication apparatus is provided. The apparatus is configured to perform the method according to the first aspect or the second aspect. Specifically, the apparatus may include a unit and/or a module, for example, a processing unit and/or a communication unit, configured to perform the method according to any one of the first aspect or the second aspect and the possible implementations of the first aspect or the second aspect.

In an implementation, the apparatus is a terminal device. When the apparatus is the terminal device, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in a terminal device. When the apparatus is the chip, the chip system, or the circuit used in the terminal device, the communication unit may be an input/output interface, an interface circuit, an output circuit, an input circuit, a pin, a related circuit, or the like on the chip, the chip system, or the circuit, and the processing unit may be at least one processor, a processing circuit, a logic circuit, or the like.

According to a sixth aspect, a communication apparatus is provided. The apparatus is configured to perform the method according to the third aspect or the fourth aspect. Specifically, the apparatus may include a unit and/or a module, for example, a processing unit and/or a communication unit, configured to perform the method according to any one of the third aspect or the fourth aspect and the possible implementations of the third aspect or the fourth aspect.

In an implementation, the apparatus is a network device. When the apparatus is the network device, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in a network device. When the apparatus is the chip, the chip system, or the circuit used in the terminal device, the communication unit may be an input/output interface, an interface circuit, an output circuit, an input circuit, a pin, a related circuit, or the like on the chip, the chip system, or the circuit, and the processing unit may be at least one processor, a processing circuit, a logic circuit, or the like.

According to a seventh aspect, a communication apparatus is provided. The apparatus includes at least one processor. The at least one processor is coupled to at least one memory. The at least one memory is configured to store a computer program or instructions. The at least one processor is configured to invoke the computer program or the instructions from the at least one memory and run the computer program or the instructions, to enable the communication apparatus to perform the method according to any one of the first aspect or the second aspect and the possible implementations of the first aspect or the second aspect.

In an implementation, the apparatus is a terminal device.

In another implementation, the apparatus is a chip, a chip system, or a circuit used in a terminal device.

According to an eighth aspect, a communication apparatus is provided. The apparatus includes at least one processor. The at least one processor is coupled to at least one memory. The at least one memory is configured to store a computer program or instructions. The at least one processor is configured to invoke the computer program or the instructions from the at least one memory and run the computer program or the instructions, to enable the communication apparatus to perform the method according to any one of the third aspect or the fourth aspect and the possible implementations of the third aspect or the fourth aspect.

In an implementation, the apparatus is a network device.

In another implementation, the apparatus is a chip, a chip system, or a circuit used in a network device.

According to a ninth aspect, this disclosure provides a processor, configured to perform the methods according to the foregoing aspects.

Operations such as sending and obtaining/receiving related to the processor may be understood as operations such as output and receiving or input of the processor, or operations such as sending and receiving performed by a radio frequency circuit and an antenna, unless otherwise specified, or provided that the operations do not contradict actual functions or internal logic of the operations in related descriptions. This is not limited in this disclosure.

According to a tenth aspect, a computer-readable storage medium is provided. The computer-readable storage medium stores program code to be executed by a device. The program code includes the method according to any one of the first aspect, the second aspect, the third aspect, or the fourth aspect and the possible implementations of the first aspect, the second aspect, the third aspect, or the fourth aspect.

According to an eleventh aspect, a computer program product including instructions is provided. When the computer program product runs on a computer, the computer is enabled to perform the method according to any one of the first aspect, the second aspect, the third aspect, or the fourth aspect and the possible implementations of the first aspect, the second aspect, the third aspect, or the fourth aspect.

According to a twelfth aspect, a chip is provided. The chip includes a processor and a communication interface. The processor reads, through the communication interface, instructions stored in a memory, to perform the method according to any one of the first aspect, the second aspect, the third aspect, or the fourth aspect and the possible implementations of the first aspect, the second aspect, the third aspect, or the fourth aspect.

Optionally, in an implementation, the chip further includes a memory. The memory stores a computer program or instructions. The processor is configured to execute the computer program or the instructions stored in the memory. When the computer program or the instructions are executed, the processor is configured to perform the method according to any one of the first aspect, the second aspect, the third aspect, or the fourth aspect and the possible implementations of the first aspect, the second aspect, the third aspect, or the fourth aspect.

According to a thirteenth aspect, a communication system is provided. The communication system includes the communication apparatuses according to the seventh aspect and the eighth aspect.

DESCRIPTION OF EMBODIMENTS

The following describes technical solutions in embodiments of this disclosure with reference to the accompanying drawings.

The technical solutions in embodiments of this disclosure may be applied to various communication systems, for example, wireless communication related to 5th generation (5G), new radio (NR), long term evolution (LTE), internet of things (IoT), wireless fidelity (Wi-Fi), wireless communication related to the 3rd generation partnership project (3GPP), or other wireless communication that may appear in the future.

Figure 1:
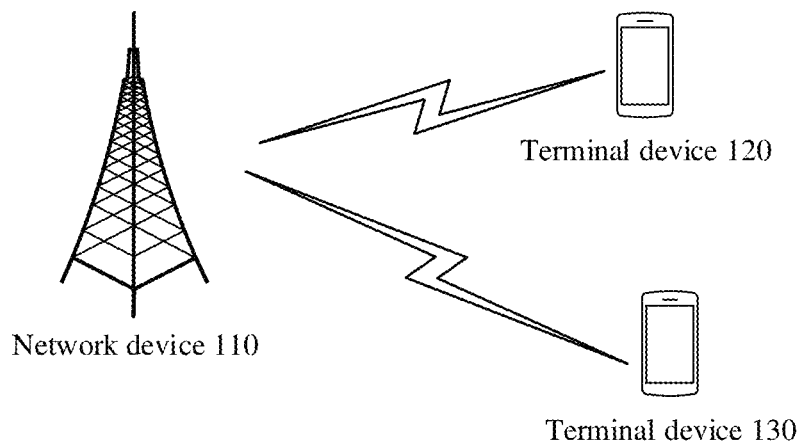
FIG. 1 is a schematic diagram of a communication system according to an embodiment of this disclosure.

FIG. 1 is a schematic diagram of a communication system according to an embodiment of this disclosure. The communication system includes at least one network device, for example, a network device 110 shown in FIG. 1. The communication system 100 may further include at least one terminal device, for example, a terminal device 120 and/or a terminal device 130 shown in FIG. 1. The network device 110 may communicate with the terminal device 120/130 through a radio link, to exchange information. It may be understood that the network device and the terminal device may also be referred to as communication devices.

The network device is a network side device that has a wireless transceiver function. The network device may be an apparatus that provides a wireless communication function for the terminal device in a radio access network (RAN), and is referred to as a RAN device. For example, the network device may be a base station, an evolved base station (eNodeB), a next-generation base station (gNB) in a 5G mobile communication system, a subsequent evolved 3GPP base station, a transmission reception point (TRP), an access node in a Wi-Fi system, a wireless relay node, or a wireless backhaul node. In communication systems using different radio access technologies (RATs), names of devices having a base station function may be different. For example, the base station may be referred to as an eNB or an eNodeB in an LTE system, or may be referred to as a gNB in a 5G system or an NR system. A specific name of the base station is not limited in this disclosure. The network device may include one or more co-site or non-co-site transmission-reception points. For another example, the network device may include one or more central units (CUs), one or more distributed units (DUs), or one or more CUs and one or more DUs. For example, a function of the CU may be implemented by one entity or different entities. For example, the function of the CU is further divided. To be specific, a control plane and a user plane are separated, and are implemented by using different entities: a control plane CU entity (namely, a CU-CP entity) and a user plane CU entity (namely, a CU-UP entity). The CU-CP entity and the CU-UP entity may be coupled to the DU, to jointly complete the function of the access network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. In this way, some functions of the radio access network device may be implemented by using a plurality of network functional entities. These network functional entities may be network elements in a hardware device, or may be functions of software run on dedicated hardware, or may be instantiated virtualization functions on a platform (for example, a cloud platform). The network device may further include an active antenna unit (AAU for short). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this disclosure. For another example, in a vehicle-to-everything (V2X) technology, the access network device may be a road side unit (RSU). A plurality of access network devices in the communication system may be base stations of a same type, or may be base stations of different types. The base station may communicate with the terminal device, or may communicate with the terminal device through a relay station. In embodiments of this disclosure, an apparatus configured to implement a function of the network device may be the network device, or may be an apparatus that can support the network device in implementing the function, for example, a chip system, or a combined component or part that can implement the function of the access network device. The apparatus may be installed in the network device. In embodiments of this disclosure, the chip system may include a chip, or may include a chip and another discrete component. In embodiments of this disclosure, the network device is used as an example to describe the technical solutions.

The terminal device is a user side device that has a wireless transceiver function, and may be a fixed device, a mobile device, a handheld device (for example, a mobile phone), a wearable device, a vehicle-mounted device, or a wireless apparatus (for example, a communication module, a modem, or a chip system) built in the foregoing device. The terminal device is configured to connect a person, an object, a machine, and the like, and may be widely used in various scenarios, for example, cellular communication, device-to-device (D2D) communication, V2X communication, machine-to-machine/machine-type communication (M2M/MTC), internet of things, virtual reality (VR), augmented reality (AR), industrial control, self-driving, remote medical, a smart grid, smart furniture, a smart office, a smart wearable, smart transportation, a smart city, an uncrewed aerial vehicle, and a robot. For example, the terminal device may be a handheld terminal in cellular communication, a communication device in D2D, an IoT device in MTC, a monitoring camera in intelligent transportation and a smart city, or a communication device in an uncrewed aerial vehicle. The terminal device may be sometimes referred to as user equipment (UE), a user terminal, a user apparatus, a user unit, a user station, a terminal, an access terminal, an access station, a UE station, a remote station, a mobile device, a wireless communication device, or the like. In embodiments of this disclosure, an apparatus configured to implement a function of the terminal device may be the terminal device, or may be an apparatus that can support the terminal device in implementing the function, for example, a chip system, or a combined component or part that can implement the function of the terminal device. The apparatus may be installed in the terminal device. For ease of description, a terminal device is used as an example for description in this disclosure.

As described above, an NR system supports a plurality of modulation and coding schemes (MCSs). Different MCSs correspond to different modulation orders and/or code rates. In a condition of a specific code rate, a higher modulation order indicates higher spectral efficiency of communication. The MCS includes quadrature phase shift keying (QPSK) modulation and quadrature amplitude modulation (QAM) in terms of a technology type dimension. A QAM technology may further include modulation schemes such as 16-QAM, 64-QAM, 256-QAM, 1024-QAM, and the like depending on different modulation orders. For a terminal device with better channel quality, the network device usually sends a downlink signal to the terminal device by using a higher-order modulation scheme, for example, 64-QAM or 256-QAM, or the terminal device sends an uplink signal by using a high-order modulation scheme, to obtain higher communication efficiency. For a terminal device with poorer channel quality, the network device sends a downlink signal to the terminal by using a lower-order modulation scheme, for example, QPSK or 16-QAM, to ensure communication reliability. In addition to the modulation order, the MCS further includes a code rate. The code rate is a decimal or a fraction greater than 0 and less than or equal to 1, for example, 1/2 or 2/3. A lower code rate indicates more added redundant bits, higher communication reliability, but lower communication spectral efficiency. Therefore, for the terminal device with better channel quality, the network device usually uses a higher code rate, to maintain higher communication efficiency. For the terminal device with poorer channel quality, the network device uses a lower code rate, to ensure higher communication reliability.

It should be noted that modulation orders corresponding to QPSK, 16-QAM, 64-QAM, 256-QAM, 1024-QAM, and 4096-QAM are 2, 4, 6, 8, 10, and 12.

In a technology, a manner of indicating an MCS by the network device is as follows: Four MCS tables are predefined. The network device indicates, by using a higher layer parameter (for example, MCS-table), a predefined MCS table to be used by the terminal device, and then indicates, by using an MCS indication field in downlink control information (DCI), an index of a used MCS in the MCS table. For example, the four predefined MCS tables are shown in Table 1 to Table 4. Table 1 is a high spectral efficiency MCS table with a highest modulation order of 6. Table 2 is an MCS table with a highest modulation order of 8. Table 3 is a low spectral efficiency MCS table with a highest modulation order of 6. Table 4 is an MCS table with a highest modulation order of 10. For example, when the higher layer parameter MCS-table is configured as 'qam256', the network device indicates the terminal device to use Table 2.

It should be understood that an actual value of a code rate in all tables in this disclosure is a value obtained by dividing a value of the code rate in the table by 1024. For example, an actual value of a code rate corresponding to a modulation and coding scheme whose index is 23 in Table 1 is 719/1024.

It should be further understood that spectral efficiency corresponding to a modulation and coding scheme in all tables in this disclosure is a product of a modulation order and a code rate corresponding to the modulation and coding scheme, or spectral efficiency corresponding to a modulation and coding scheme is an approximate value of a product of a modulation order and a code rate corresponding to the modulation and coding scheme. The approximate value may be understood as a result obtained after S decimal places are reserved for the product of the modulation order and the code rate, and S is a natural number. For example, if a code rate corresponding to a modulation and coding scheme #1 whose modulation order is 2 is 120/1024, spectral efficiency of the modulation and coding scheme #1 may be 2*(120/1024), or spectral efficiency of the modulation and coding scheme #1 may be an approximate value of 2*(120/1024), for example, an approximate value 0.2344 obtained after 2*(120/1024) is reserved with four decimal places.

TABLE 1

| MCS index | Modulation order | Code rate | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

TABLE 2

| MCS index | Modulation order | Code rate | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | Reserved |
| 29 | 4 | | Reserved |
| 30 | 6 | | Reserved |
| 31 | 8 | | Reserved |

TABLE 3

| MCS index | Modulation order | Code rate | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | Reserved |
| 30 | 4 | | Reserved |
| 31 | 6 | | Reserved |

TABLE 4

| MCS index | Modulation order | Code rate | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |

TABLE 4-continued

| MCS index | Modulation order | Code rate | Spectral efficiency |
| --- | --- | --- | --- |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | | Reserved |
| 28 | 4 | | Reserved |
| 29 | 6 | | Reserved |
| 30 | 8 | | Reserved |
| 31 | 10 | | Reserved |

It can be learned that there are some reserved positions in the foregoing tables. The reserved positions are used for retransmission. If initial transmission fails, during retransmission, the network device indicates a modulation and coding scheme of retransmission to the terminal device. An index of the modulation and coding scheme of retransmission may be less than or equal to an index of a modulation and coding scheme of initial transmission (or spectral efficiency of the modulation and coding scheme of retransmission may be less than or equal to spectral efficiency of the modulation and coding scheme of initial transmission). Alternatively, the modulation and coding scheme of retransmission may be a reserved position in the MCS table, and a modulation and coding scheme of the reserved position corresponds to only one modulation order. For example, when the network device indicates only the modulation order to the terminal, data sent or received by the terminal device is still data generated after previous channel coding. In this way, channel coding does not need to be performed again. This reduces a transmission delay and an energy loss.

In a fixed wireless access (FWA) scenario, customer premise equipment (CPE) device is usually configured with a plurality of receive antennas. Consequently, channel quality is better than that for a conventional mobile access user (for example, a mobile phone user), and 4096-QAM may be used to further improve spectral efficiency. However, in an existing NR system, a highest modulation order of a standardized MCS is 10, namely, 1024-QAM. A corresponding MCS for 4096-QAM is not defined and standardized in an existing standard.

In view of this, this disclosure provides a communication method, to implement use of 4096-QAM for communication in a communication system, so that a terminal with better channel quality can obtain higher communication efficiency. The following describes in detail the communication method provided in this disclosure.

Figure 2:
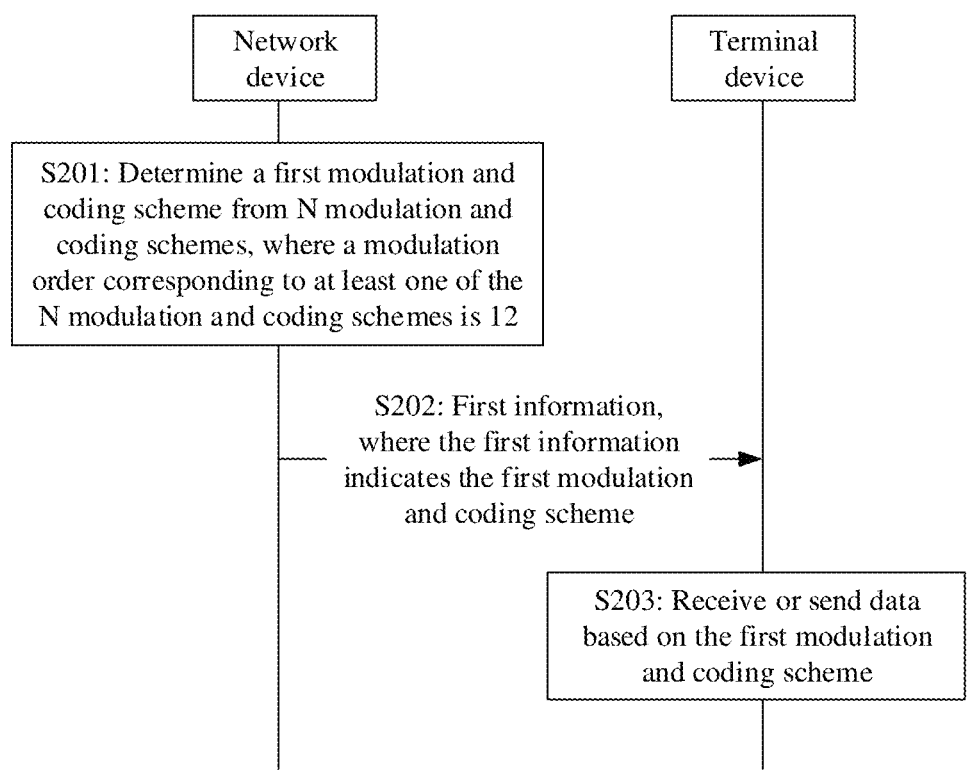
FIG. 2 is a schematic flowchart of a communication method according to this disclosure.

FIG. 2 is a schematic flowchart of the communication method according to this disclosure. For ease of description, the following uses interaction between a terminal device and a network device as an example for description.

S201: The network device determines a first modulation and coding scheme from N modulation and coding schemes, where a modulation order corresponding to at least one of the N modulation and coding schemes is 12, and N is a positive integer.

Optionally, one modulation and coding scheme corresponds to one modulation order and one code rate.

Optionally, a quantity of modulation and coding schemes whose modulation orders are 12 in the N modulation and coding schemes is X, where X∈N, and X is a positive integer. For example, X=4, 5, or 6.

Optionally, code rates corresponding to the X modulation and coding schemes whose modulation orders are 12 may be any X of the following values: 790/1024, 821.5/1024, 853/1024, 884.5/1024, 916.5/1024, 829.5/1024, 869/1024, 908.5/1024, 816.5/1024, 842.5/1024, 869/1024, 895.5/1024, 921.5/1024, and 948/1024. This is not specifically limited in this disclosure.

Optionally, X=4, and code rates corresponding to the four modulation and coding schemes are 829.5/1024, 869/1024, 908.5/1024, and 948/1024. In this design manner, it can be found through simulation verification that, on an additive white gaussian noise (AWGN) channel, a 10% BLER-SNR interval corresponding to modulation and coding schemes whose modulation orders are 10 (1024-QAM) (for example, code rates corresponding to the modulation and coding schemes whose modulation orders are 10 are 805.5/1024, 853/1024, 900.5/1024, and 948/1024) is basically equal to a 10% BLER-SNR interval corresponding to the four modulation and coding schemes whose modulation and coding orders are 12. This facilitates link adaptation by a wireless communication system. The 10% BLER-SNR is a signal-to-noise ratio (SNR) corresponding to a case in which a block error rate (BLER) is equal to 10%. In addition, a quantity of modulation and coding schemes whose modulation orders are 12 is an even number, which simplifies a design of a channel quality indicator (CQI) table. The modulation and coding schemes whose modulation orders are 12 in an MCS table may be selected at equal intervals as entries in the channel quality indicator table. For example, two MCSs whose modulation orders are 12 and code rates are 829.5/1024 and 908.5/1024 may be selected as entries in the CQI table, or two MCSs whose modulation orders are 12 and code rates are 869/1024 and 948/1024 may be selected as entries in the CQI table.

Optionally, X=5, and code rates corresponding to the five modulation and coding schemes are 821.5/1024, 853/1024, 884.5/1024, 916.5/1024, and 948/1024.

Optionally, X=6, and code rates corresponding to the six modulation and coding schemes are 816.5/1024, 842.5/1024, 869/1024, 895.5/1024, 921.5/1024, and 948/1024. In this design manner, a spectral efficiency interval corresponding to modulation and coding schemes whose modulation orders are 10 (1024-QAM) (for example, code rates corresponding to the modulation and coding schemes whose modulation orders are 10 are 805.5/1024, 853/1024, 900.5/1024, and 948/1024) is basically equal to a spectral efficiency interval corresponding to the six modulation and coding schemes whose modulation and coding orders are 12. This facilitates link adaptation by a wireless communication system, to overcome or adapt to impact caused by a current channel change. In addition, the quantity of modulation and coding schemes whose modulation orders are 12 is an even number, which simplifies the design of the CQI table, and the modulation and coding schemes whose modulation orders are 12 in the MCS table may be selected at equal intervals as entries in the CQI table. For example, three MCSs whose modulation orders are 12 and code rates are 816.5/1024, 869/1024, and 921.5/1024 may be selected as entries in the CQI table, or three MCSs whose modulation orders are 12 and code rates are 842.5/1024, 895.5/1024, and 948/1024 may be selected as entries in the CQI table.

Optionally, the N modulation and coding schemes may further include one or more modulation and coding schemes corresponding to a modulation order that is 2, 4, 6, 10, or the like.

Optionally, the N modulation and coding schemes do not include a modulation and coding scheme whose modulation order is 2, or a quantity of modulation and coding schemes whose modulation order is 2 in the N modulation and coding schemes is 1.

Optionally, when the quantity of modulation and coding schemes whose modulation order is 2 in the N modulation and coding schemes is 1, a code rate corresponding to the modulation and coding scheme whose modulation order is 2 is 120/1024, and spectral efficiency is 0.2344; or a code rate corresponding to the modulation and coding scheme whose modulation order is 2 is 193/1024, and spectral efficiency is 0.3770.

Optionally, the N modulation and coding schemes do not include a modulation and coding scheme whose modulation order is 4, or a quantity of modulation and coding schemes whose modulation order is 4 in the N modulation and coding schemes is 1.

Optionally, when the quantity of modulation and coding schemes whose modulation order is 4 in the N modulation and coding schemes is 1, a code rate corresponding to the modulation and coding scheme whose modulation order is 4 is 378/1024, and spectral efficiency is 1.4766; or a code rate corresponding to the modulation and coding scheme whose modulation order is 4 is 490/1024, and spectral efficiency is 1.9141.

It should be understood that, for a user that can use 4096-QAM, channel quality for the user is good. For example, in a potential application scenario of 4096-QAM, namely, a fixed wireless access scenario, a CPE device is fixedly installed, and a channel changes slowly and stably. In addition, a plurality of downlink receive antennas are configured for the CPE device, and a possibility of using low-order modulation (for example, QPSK or 16-QAM) is low. Therefore, the N modulation and coding schemes may include a small quantity of modulation and coding schemes with low modulation orders. In a specific implementation, the N modulation and coding schemes correspond to one MCS table. The following uses an example to describe the MCS table that may correspond to the N modulation and coding schemes.

Table 5 is a possible example of the MCS table corresponding to the N (N=32) modulation and coding schemes. The N modulation and coding schemes include one modulation and coding scheme whose modulation order is 2, one modulation and coding scheme whose modulation order is 4, and four modulation and coding schemes whose modulation orders are 12. Code rates corresponding to the modulation and coding schemes whose modulation orders are 12 are 829.5/1024, 869/1024, 908.5/1024, and 948/1024.

For example, MCS indexes in all tables in this disclosure are arranged in ascending order of modulation orders, and modulation and coding schemes corresponding to a same modulation order are arranged in ascending order of code rates.

TABLE 5

| MCS index | Modulation order | Code rate | Spectral efficiency |
|---|---|---|---|
| 0 | 2 | 120 | 0.2344 |
| 1 | 4 | 378 | 1.4766 |
| 2 | 6 | 466 | 2.7305 |

TABLE 5-continued

| MCS index | Modulation order | Code rate | Spectral efficiency |
|---|---|---|---|
| 3 | 6 | 567 | 3.3223 |
| 4 | 6 | 616 | 3.6094 |
| 5 | 6 | 666 | 3.9023 |
| 6 | 6 | 719 | 4.2129 |
| 7 | 6 | 772 | 4.5234 |
| 8 | 6 | 822 | 4.8164 |
| 9 | 6 | 873 | 5.1152 |
| 10 | 8 | 682.5 | 5.3320 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | | Reserved |
| 27 | 4 | | Reserved |
| 28 | 6 | | Reserved |
| 29 | 8 | | Reserved |
| 30 | 10 | | Reserved |
| 31 | 12 | | Reserved |

For example, Table 5 includes a same quantity of indexes as that included in an existing standardized MCS table, and includes a total of 32 indexes. Indexes 26 to 31 are reserved positions for modulation and coding schemes whose modulation orders are 2, 4, 6, 8, 10, and 12. In other words, some of the N modulation and coding schemes may correspond to only one modulation order.

Table 6 is another possible example of the MCS table corresponding to the N (N=32) modulation and coding schemes. The N modulation and coding schemes include one modulation and coding scheme whose modulation order is 2, one modulation and coding scheme whose modulation order is 4, and five modulation and coding schemes whose modulation orders are 12. Code rates corresponding to the modulation and coding schemes whose modulation orders are 12 are 821.5/1024, 853/1024, 884.5/1024, 916.5/1024, and 948/1024.

TABLE 6

| MCS index | Modulation order | Code rate | Spectral efficiency |
|---|---|---|---|
| 0 | 2 | 120 | 0.2344 |
| 1 | 4 | 378 | 1.4766 |
| 2 | 6 | 466 | 2.7305 |
| 3 | 6 | 567 | 3.3223 |
| 4 | 6 | 666 | 3.9023 |
| 5 | 6 | 719 | 4.2129 |
| 6 | 6 | 772 | 4.5234 |
| 7 | 6 | 822 | 4.8164 |
| 8 | 6 | 873 | 5.1152 |
| 9 | 8 | 682.5 | 5.3320 |
| 10 | 8 | 711 | 5.5547 |
| 11 | 8 | 754 | 5.8906 |
| 12 | 8 | 797 | 6.2266 |
| 13 | 8 | 841 | 6.5703 |
| 14 | 8 | 885 | 6.9141 |
| 15 | 8 | 916.5 | 7.1602 |
| 16 | 8 | 948 | 7.4063 |
| 17 | 10 | 805.5 | 7.8662 |
| 18 | 10 | 853 | 8.3301 |
| 19 | 10 | 900.5 | 8.7939 |

TABLE 6-continued

| MCS index | Modulation order | Code rate | Spectral efficiency |
|---|---|---|---|
| 20 | 10 | 948 | 9.2578 |
| 21 | 12 | 821.5 | 9.6270 |
| 22 | 12 | 853 | 9.996 |
| 23 | 12 | 884.5 | 10.3652 |
| 24 | 12 | 916.5 | 10.7402 |
| 25 | 12 | 948 | 11.1094 |
| 26 | 2 |  | Reserved |
| 27 | 4 |  | Reserved |
| 28 | 6 |  | Reserved |
| 29 | 8 |  | Reserved |
| 30 | 10 |  | Reserved |
| 31 | 12 |  | Reserved |

Table 7 is still another possible example of the MCS table corresponding to the N (N=32) modulation and coding schemes. The N modulation and coding schemes include one modulation and coding scheme whose modulation order is 2, one modulation and coding scheme whose modulation order is 4, and six modulation and coding schemes whose modulation orders are 12. Code rates corresponding to the modulation and coding schemes whose modulation orders are 12 are 816.5/1024, 842.5/1024, 869/1024, 895.5/1024, 921.5/1024, and 948/1024.

TABLE 7

| MCS index | Modulation order | Code rate | Spectral efficiency |
|---|---|---|---|
| 0 | 2 | 120 | 0.2344 |
| 1 | 4 | 378 | 1.4766 |
| 2 | 6 | 466 | 2.7305 |
| 3 | 6 | 567 | 3.3223 |
| 4 | 6 | 666 | 3.9023 |
| 5 | 6 | 772 | 4.5234 |
| 6 | 6 | 822 | 4.8164 |
| 7 | 6 | 873 | 5.1152 |
| 8 | 8 | 682.5 | 5.3320 |
| 9 | 8 | 711 | 5.5547 |
| 10 | 8 | 754 | 5.8906 |
| 11 | 8 | 797 | 6.2266 |
| 12 | 8 | 841 | 6.5703 |
| 13 | 8 | 885 | 6.9141 |
| 14 | 8 | 916.5 | 7.1602 |
| 15 | 8 | 948 | 7.4063 |
| 16 | 10 | 805.5 | 7.8662 |
| 17 | 10 | 853 | 8.3301 |
| 18 | 10 | 900.5 | 8.7939 |
| 19 | 10 | 948 | 9.2578 |
| 20 | 12 | 816.5 | 9.5684 |
| 21 | 12 | 842.5 | 9.8730 |
| 22 | 12 | 869 | 10.1836 |
| 23 | 12 | 895.5 | 10.4941 |
| 24 | 12 | 921.5 | 10.7988 |
| 25 | 12 | 948 | 11.1094 |
| 26 | 2 |  | Reserved |
| 27 | 4 |  | Reserved |
| 28 | 6 |  | Reserved |
| 29 | 8 |  | Reserved |
| 30 | 10 |  | Reserved |
| 31 | 12 |  | Reserved |

Table 8 is still another possible example of the MCS table corresponding to the N (N=32) modulation and coding schemes. The N modulation and coding schemes do not include a modulation and coding scheme whose modulation order is 2, but include one modulation and coding scheme whose modulation order is 4 and four modulation and coding schemes whose modulation orders are 12. Code rates corresponding to the modulation and coding schemes whose modulation orders are 12 are 829.5/1024, 869/1024, 908.5/1024, and 948/1024.

TABLE 8

| MCS index | Modulation order | Code rate | Spectral efficiency |
|---|---|---|---|
| 0 | 4 | 378 | 1.4766 |
| 1 | 6 | 466 | 2.7305 |
| 2 | 6 | 517 | 3.0293 |
| 3 | 6 | 567 | 3.3223 |
| 4 | 6 | 616 | 3.6094 |
| 5 | 6 | 666 | 3.9023 |
| 6 | 6 | 719 | 4.2129 |
| 7 | 6 | 772 | 4.5234 |
| 8 | 6 | 822 | 4.8164 |
| 9 | 6 | 873 | 5.1152 |
| 10 | 8 | 682.5 | 5.3320 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 |  | Reserved |
| 27 | 4 |  | Reserved |
| 28 | 6 |  | Reserved |
| 29 | 8 |  | Reserved |
| 30 | 10 |  | Reserved |
| 31 | 12 |  | Reserved |

Optionally, the possible MCS table may not include a reserved position for the modulation order that is 2 and/or a reserved position for the modulation order that is 4. A reason is as follows: In consideration of a case in which channel quality of a terminal device for which an MCS table including 4096-QAM is configured is usually better, during initial transmission, a base station usually selects a modulation and coding scheme with a higher modulation order. Therefore, during retransmission, the network device should not indicate a reserved position for a corresponding lower modulation order in the MCS table. A reason is that, during retransmission, if a reserved position indicated by the network device is the reserved position for the lower modulation order in the MCS table, an actual transmission code rate may be higher than a maximum code rate limit, or even if the actual transmission code rate does not exceed the maximum code rate limit, transmission performance is affected because the code rate is high. For example, if the network device indicates, during initial transmission, to use a modulation and coding scheme whose modulation order is 6 and whose code rate is 466/1024, the network device does not indicate the terminal device to use a reserved position for the modulation order that is 2. A reason is that, in this case, a code rate corresponding to the reserved position for the modulation order that is 2 exceeds a limit of a maximum modulation code rate of 0.95. For example, as shown in Table 9, the MCS table may not include a reserved position for the modulation order that is 2.

TABLE 9

| MCS index | Modulation order | Code rate | Spectral efficiency |
|---|---|---|---|
| 0 | 2 | 120 | 0.2344 |
| 1 | 4 | 378 | 1.4766 |
| 2 | 6 | 466 | 2.7305 |

TABLE 9-continued

| MCS index | Modulation order | Code rate | Spectral efficiency |
|---|---|---|---|
| 3 | 6 | 517 | 3.0293 |
| 4 | 6 | 567 | 3.3223 |
| 5 | 6 | 616 | 3.6094 |
| 6 | 6 | 666 | 3.9023 |
| 7 | 6 | 719 | 4.2129 |
| 8 | 6 | 772 | 4.5234 |
| 9 | 6 | 822 | 4.8164 |
| 10 | 6 | 873 | 5.1152 |
| 11 | 8 | 682.5 | 5.3320 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 805.5 | 7.8662 |
| 20 | 10 | 853 | 8.3301 |
| 21 | 10 | 900.5 | 8.7939 |
| 22 | 10 | 948 | 9.2578 |
| 23 | 12 | 829.5 | 9.7207 |
| 24 | 12 | 869 | 10.1836 |
| 25 | 12 | 908.5 | 10.6465 |
| 26 | 12 | 948 | 11.1094 |
| 27 | 4 | Reserved | |
| 28 | 6 | Reserved | |
| 29 | 8 | Reserved | |
| 30 | 10 | Reserved | |
| 31 | 12 | Reserved | |

Optionally, a quantity of indexes included in the example MCS table in this disclosure may be different from a quantity of indexes included in an existing standardized MCS table. For example, the MCS table may also include 64 MCSs.

Optionally, the N modulation and coding schemes do not include a modulation and coding scheme whose modulation order is 10 and whose code rate is 948/1024, but include a modulation and coding scheme whose modulation order is 12 and whose code rate is 790/1024. For example, modulation and coding schemes whose modulation orders are 10 and whose code rates are 948/1024 in Table 4 to Table 8 may be replaced with modulation and coding schemes whose modulation orders are 12 and whose code rates are 790/1024. A specific table is not provided herein. Only a simple example is used for description. When X=6, code rates corresponding to the six modulation and coding schemes whose modulation orders are 12 are 790/1024, 821.5/1024, 853/1024, 884.5/1024, 916.5/1024, and 948/1024. It should be understood that, in this design manner, approximate spectral efficiency intervals can be ensured between all modulation and coding schemes whose modulation orders are 12 and whose modulation orders are 10. This facilitates link adaptation to avoid an impact caused by a channel status change. In addition, the quantity of modulation and coding schemes whose modulation orders are 12 is an even number, which simplifies the design of the CQI table, and the modulation and coding schemes whose modulation orders are 12 in the MCS table may be selected at equal intervals as entries in the CQI table. For example, three MCSs whose modulation orders are 12 and code rates are 790/1024, 853/1024, and 916.5/1024 may be selected as entries in the CQI table, or three MCSs whose modulation orders are 12 and code rates are 821.5/1024, 884.5/1024, and 948/1024 may be selected as entries in the CQI table.

It may be understood that a reason for replacing the modulation and coding scheme whose modulation order is 10 and whose code rate is 948/1024 with the modulation and coding scheme whose modulation order 12 and whose code rate is 790/1024 is as follows: In an existing NR system, overheads actually for transmitting some signals do not match equivalent overheads for calculating a transport block size. As a result, an actual code rate is greater than a code rate corresponding to a modulation and coding scheme indicated by the network device. For the modulation and coding scheme whose modulation order is 10 and whose code rate is 948/1024, because the code rate is very high, an increase in the code rate causes a sharp decrease in performance of the modulation and coding scheme, and a limit of a maximum code rate may be exceeded. Therefore, during design of the MCS table, the modulation and coding scheme whose spectral efficiency is approximate but whose code rate is lower, whose modulation order is 12, and whose equivalent code rate is 790/1024 is considered to be used.

Optionally, some of the N modulation and coding schemes may be selected by the network device from one or more of four existing standardized predefined MCS tables. A highest modulation order of a modulation and coding scheme in the four existing standardized predefined MCS tables is 6, 8, or 10.

It should be understood that the foregoing examples are merely examples of several possible design manners of the MCS table corresponding to 4096-QAM, and do not constitute any limitation on this disclosure.

S202: The network device sends first information to the terminal device, where the first information indicates a first modulation and coding scheme.

Correspondingly, the terminal device receives the first information.

For ease of understanding, an example in which the N modulation and coding schemes correspond to Table 5 is used herein for description.

Optionally, the first information indicates an MCS index of the first modulation and coding scheme in Table 5.

Optionally, the first information is an MCS indication field in DCI.

Optionally, if the network device does not indicate, to the terminal device, which MCS table is specifically to be used, it may be understood that Table 5 is a default predefined MCS table of the network device and the terminal device. To be specific, when the network device does not indicate which MCS table is specifically to be used, the terminal device determines the first modulation and coding scheme from the default Table 5 based on the first indication information. For example, if the network device does not indicate the terminal device to use an MCS table whose highest modulation order is 6, 8, or 10, the terminal device uses a default MCS table of 4096-QAM, for example, Table 5.

Optionally, the network device may indicate a specific MCS table to the terminal device. Before S202, the method further includes: The network device sends first signaling to the terminal device, where the first signaling indicates an MCS table #1. For example, a higher layer parameter indicates the terminal device to use the MCS table of 4096-QAM, namely, an MCS table whose highest modulation order is 12. For example, if a higher layer parameter MCS-table is configured as 'qam4096', the terminal device uses the MCS table of 4096-QAM, for example, Table 5.

Correspondingly, the terminal device receives the first signaling, and determines to use Table 5. Then, the terminal device determines the first modulation and coding scheme from Table 5 based on the first information.

S203: The terminal device receives or sends data based on the first modulation and coding scheme.

It may be understood that, in the embodiment corresponding to FIG. 2, an MCS table used for 4096-QAM is predefined, to meet the requirement of using 4096-QAM in the communication system, so that the terminal with better channel quality can obtain higher communication efficiency.

It can be learned that the foregoing predefined MCS table of 4096-QAM can include only fixed entries, and is limited by a fixed size of the MCS table. For example, the MCS table includes only 32 entries. Because a communication environment is complex and changeable, the predefined table is no longer sufficient for a wireless communication system in which higher order modulation (for example, 4096-QAM) is introduced. As a result, flexibility of a modulation and coding scheme that can be used by the terminal device is greatly limited. In view of this, this disclosure provides a flexible MCS configuration manner.

Figure 3:
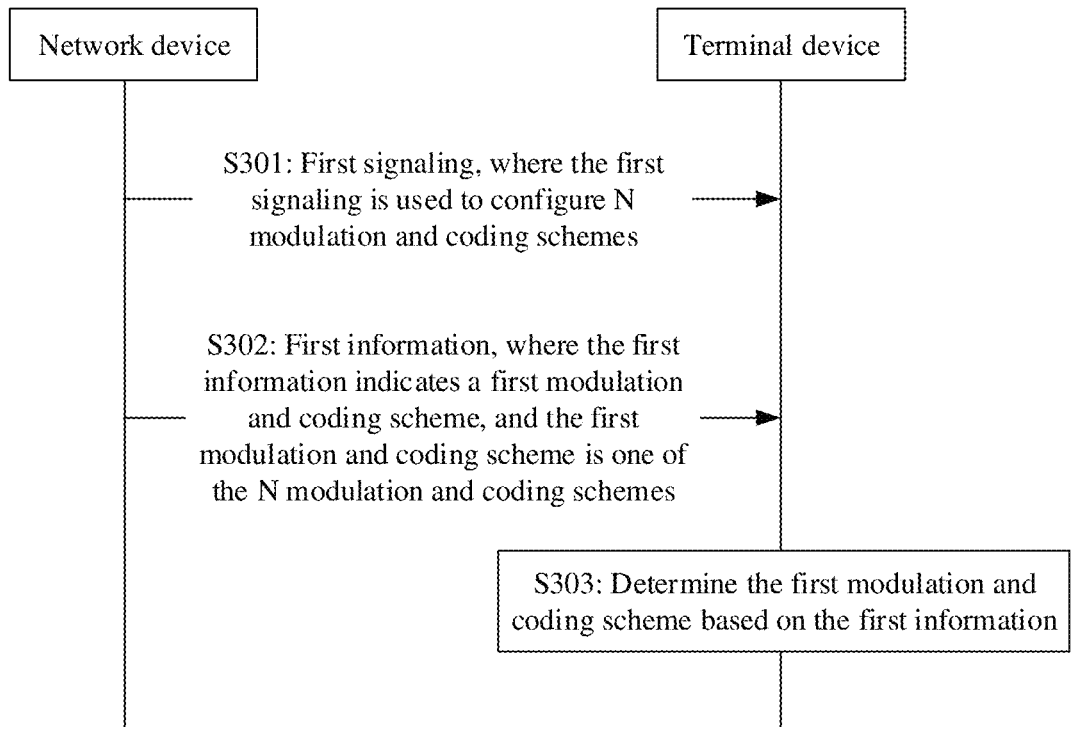
FIG. 3 is a schematic flowchart of another communication method according to this disclosure.

FIG. 3 is a schematic flowchart of another communication method according to this disclosure.

S301: A network device sends first signaling to a terminal device, where the first signaling is used to configure the N modulation and coding schemes, and N is a positive integer.

Correspondingly, the terminal device receives the first signaling, and determines the N modulation and coding schemes configured by using the first signaling. Optionally, the N modulation and coding schemes include at least one modulation and coding scheme whose modulation order is 12. In other words, the network device may flexibly configure the N modulation and coding schemes by using the first signaling, and the N modulation and coding schemes may include one or more modulation and coding schemes whose modulation orders are 12. For example, the N modulation and coding schemes configured by the network device may include only one modulation and coding scheme whose modulation order is 12, and a code rate of the modulation and coding scheme may be 816.5/1024; or the N modulation and coding schemes configured by the network device may include two modulation and coding schemes whose modulation orders are 12, and code rates of the two modulation and coding schemes may be 816.5/1024 and 842.5/1024 respectively.

It may be understood that the N modulation and coding schemes are flexibly configured by the network device based on quality of a channel between the terminal device and the network device. For example, for a terminal device with better channel quality, the network device usually sends a downlink signal to the terminal device by using a higher-order modulation scheme, for example, 1024-QAM or 4086-QAM, or the terminal device sends an uplink signal by using a higher-order modulation scheme, to obtain higher communication efficiency. For a terminal device with poorer channel quality, the network device may configure a large quantity of lower-order modulation schemes, for example, QPSK or 16-QAM, to send a downlink signal to the terminal, so as to ensure communication reliability.

In an implementation, the first signaling includes second information and third information. The second information indicates M modulation and coding schemes. The third information indicates L modulation and coding schemes. M and L are positive integers. The M modulation and coding schemes are modulation and coding schemes added to a first modulation and coding scheme set. The L modulation and coding schemes are modulation and coding schemes that are removed from the first modulation and coding scheme set or not used. Therefore, it may be understood that the N modulation and coding schemes configured by the network device by using the first signaling include a modulation and coding scheme other than the L modulation and coding schemes in the first modulation and coding scheme set and the M modulation and coding schemes.

Optionally, the first modulation and coding scheme set is a modulation and coding scheme set indicated by the network device to the terminal device by using second signaling.

Optionally, the first modulation and coding scheme set is a predefined MCS table of modulation and coding schemes with a highest modulation order of 6, 8, or 10. For example, the first modulation and coding scheme set may be any one of the MCS tables shown in Table 1 to Table 4.

Optionally, the first modulation and coding scheme set is any one of the MCS tables of 4096-QAM predefined in the embodiment corresponding to FIG. 2.

Optionally, the first signaling and the second signaling may be included in same signaling and sent simultaneously, or may not be sent simultaneously. This is not specifically limited in this disclosure.

The following uses an example to describe how to flexibly configure the N modulation and coding schemes by using the first signaling.

The first modulation and coding scheme set is shown in Table 10. A highest modulation order of a modulation and coding scheme in the first modulation and coding scheme set is 10. The second information in the first signaling indicates four added modulation and coding schemes in the first modulation and coding scheme. The four added modulation and coding schemes are shown in Table 11. The third information in the first signaling indicates that five modulation and coding schemes whose indexes are 1, 2, 4, 5, and 7 in the first modulation and coding scheme set are forbidden. In this case, the N modulation and coding schemes configured by using the first signaling are shown in Table 12.

TABLE 10

| MCS index | Modulation order | Code rate | Spectral efficiency |
|---|---|---|---|
| 0 | 2 | 120 | 0.2344 |
| 1 | 2 | 192 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 961.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | | Reserved |
| 28 | 4 | | Reserved |
| 29 | 6 | | Reserved |
| 30 | 8 | | Reserved |
| 31 | 10 | | Reserved |

TABLE 11

| Modulation order | Code rate | Spectral efficiency |
|---|---|---|
| 12 | 816.5 | 9.5684 |
| 12 | 843 | 9.8789 |
| 12 | 869 | 10.1836 |
| 12 | | Reserved |

TABLE 12

| MCS index | Modulation order | Code rate | Spectral efficiency |
|---|---|---|---|
| 0 | 2 | 120 | 0.2344 |
| 1 | 4 | 378 | 1.4766 |
| 2 | 6 | 466 | 2.7305 |
| 3 | 6 | 567 | 3.3223 |
| 4 | 6 | 616 | 3.6094 |
| 5 | 6 | 666 | 3.9023 |
| 6 | 6 | 719 | 4.2129 |
| 7 | 6 | 772 | 4.5234 |
| 8 | 6 | 822 | 4.8164 |
| 9 | 6 | 873 | 5.1152 |
| 10 | 8 | 682.5 | 5.3320 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 961.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 816.5 | 9.5684 |
| 23 | 12 | 843 | 9.8789 |
| 24 | 12 | 869 | 10.1836 |
| 25 | 2 | | Reserved |
| 26 | 4 | | Reserved |
| 27 | 6 | | Reserved |
| 28 | 8 | | Reserved |
| 29 | 10 | | Reserved |
| 30 | 12 | | Reserved |

In another implementation, the N modulation and coding schemes configured by using the first signaling include at least one modulation and coding scheme in a second modulation and coding scheme set and/or at least one modulation and coding scheme in a third modulation and coding scheme set. The second modulation and coding scheme set may be understood as one or more tables in a predefined MCS table of modulation and coding schemes with a highest modulation and coding scheme order of 6, 8, or 10. For example, the first modulation and coding scheme set is any one of the MCS tables shown in Table 1 to Table 4. The third modulation and coding scheme set may be understood as one or more tables in a predefined MCS table of 4096-QAM. For example, the N modulation and coding schemes indicated by the first signaling may be included in the second modulation and coding scheme set, or the N modulation and coding schemes may be included in the third modulation and coding scheme set, or one part of the N modulation and coding schemes are included in the second modulation and coding scheme set, and the other part of the N modulation and coding schemes are included in the third modulation and coding scheme set.

In a specific implementation, the network device may configure, by using the first signaling, MCS indexes of the N modulation and coding schemes in the corresponding second modulation and coding scheme set or the corresponding third modulation and coding scheme set. For example, the first signaling indicates MCS indexes #3 and #4 in Table 5, MCS indexes #7 and #8 in Table 6, MCS indexes #10 and #11 in Table 7, and MCS indexes #23 and #24 in Table 8. In other words, the foregoing eight modulation and coding schemes are configured in the first signaling.

In another implementation, the N modulation and coding schemes are configured by using the first signaling. The first signaling includes one or more pieces of fourth information. Each piece of fourth information indicates one or more modulation and coding schemes, and the one or more modulation and coding schemes indicated by each piece of fourth information correspond to a same modulation order and different code rates.

Optionally, the fourth information indicates a modulation order corresponding to one or more modulation and coding schemes, and a code rate corresponding to each of the one or more modulation and coding schemes.

For example, the first signaling includes information #1 to information #3. The information #1 indicates four modulation and coding schemes, modulation orders of the four modulation and coding schemes are 8, and code rates of the four modulation and coding schemes are 797/1024, 841/1024, 885/1024, and 916.5/1024. The information #2 indicates four modulation and coding schemes, modulation orders corresponding to the four modulation and coding schemes are all 10, and code rates are 790/1024, 805.5/1024, 853/1024, and 900.5/1024. The information #3 indicates five modulation and coding schemes, modulation orders of the five modulation and coding schemes are 12, and code rates are 790/1024, 805.5/1024, 853/1024, 900.5/1024, and 948/1024.

For example, the fourth information may indicate, in the following manners, a code rate respectively corresponding to one or more modulation and coding schemes:

Optional manner 1: The fourth information may include one or more pieces of sub-information. The one or more pieces of sub-information is in a one-to-one correspondence with the one or more modulation and coding schemes indicated by the fourth information. Each piece of sub-information indicates one or more code rates in a manner of indicating a code rate index. The code rate index is an index, in a code rate set, of a code rate of a modulation and coding scheme corresponding to the sub-information. The code rate set may be predefined. For example, the code rate set is shown in Table 13. When the sub-information indicates code rate indexes 0, 3, 6, and 9, it indicates that code rates corresponding to four modulation and coding schemes corresponding to the sub-information are 0.5, 0.125, 0.2, and 0.275.

TABLE 13

| Code rate index | Code rate |
|---|---|
| 0 | 0.5 |
| 1 | 0.75 |
| 2 | 0.1 |
| 3 | 0.125 |
| 4 | 0.15 |
| 5 | 0.175 |
| 6 | 0.2 |
| 7 | 0.225 |
| 8 | 0.25 |
| 9 | 0.275 |
| 10 | 0.3 |
| 11 | 0.325 |
| 12 | 0.35 |
| 13 | 0.375 |
| 14 | 0.4 |

TABLE 13-continued

| Code rate index | Code rate |
| --- | --- |
| 15 | 0.425 |
| 16 | 0.45 |
| 17 | 0.475 |
| 18 | 0.5 |
| 19 | 0.525 |
| 20 | 0.55 |
| 21 | 0.575 |
| 22 | 0.6 |
| 23 | 0.625 |
| 24 | 0.65 |
| 25 | 0.675 |
| 26 | 0.7 |
| 27 | 0.725 |
| 28 | 0.75 |
| 29 | 0.775 |
| 30 | 0.8 |
| 31 | 0.825 |
| 32 | 0.85 |
| 33 | 0.875 |
| 34 | 0.9 |
| 35 | 0.925 |

Optional manner 2: The fourth information may include one or more pieces of sub-information. The one or more pieces of sub-information is in a one-to-one correspondence with the one or more modulation and coding schemes indicated by the fourth information. Each piece of sub-information represents one code rate by using 10 bits. For example, the fourth information may include sub-information #1 and sub-information #2. Both of the two pieces of sub-information are 10 bits. The sub-information #1 indicates 900 by using 10 bits, and the sub-information #1 indicates 948 by using 10 bits. In other words, the two pieces of sub-information indicate two bit rates 900/1024 and 948/1024.

Optionally, intervals between spectral efficiency corresponding to any two adjacent modulation and coding schemes in the N predefined or flexibly configured modulation and coding schemes in this disclosure are equal. The N modulation and coding schemes are arranged in ascending order of modulation orders, and modulation and coding schemes corresponding to a same modulation order are arranged in ascending order of code rates. The arrangement order may be reversed, that is, the N modulation and coding schemes are arranged in descending order of modulation orders, and modulation and coding schemes corresponding to a same modulation order are arranged in descending order of code rates. This is not specifically limited in this disclosure.

S302: The network device sends first information to the terminal device, where the first information indicates a first modulation and coding scheme, and the first modulation and coding scheme is one of the N modulation and coding schemes.

Correspondingly, the terminal device receives the first information.

S303: The terminal device determines the first modulation and coding scheme from the N modulation and coding schemes based on the first information.

Then, the terminal device receives or sends data based on the first modulation and coding scheme.

It can be learned that, in the foregoing technical solution, the network device can flexibly configure the MCS table by using the first signaling for communication quality of different terminal devices, to avoid a problem that a predefined MCS table cannot match an actual transmission status of the terminal device.

The foregoing describes in detail the communication method provided in this disclosure, and the following describes a communication apparatus provided in this application.

Figure 4:
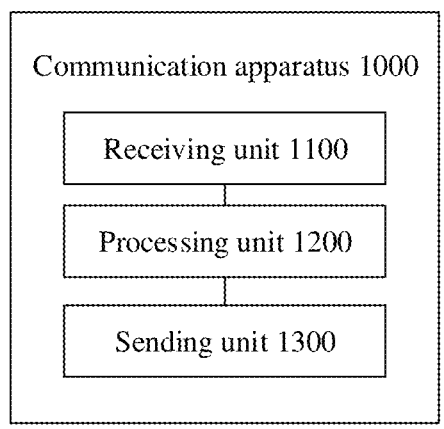
FIG. 4 is a schematic block diagram of a communication apparatus 1000 according to this disclosure.

FIG. 4 is a schematic block diagram of the communication apparatus 1000 according to this disclosure.

In a possible design, the communication apparatus 1000 includes a receiving unit 1100 and a processing unit 1200. The communication apparatus 1000 may implement a step or a procedure performed by the terminal device in the foregoing method embodiments. For example, the communication apparatus 1000 may be a terminal device, or may be a chip or a circuit configured in a terminal device. The receiving unit 1100 is configured to perform a receiving-related operation of the terminal device in the foregoing method embodiments, and the processing unit 1200 is configured to perform a processing-related operation of the terminal device in the foregoing method embodiments.

In a possible implementation, the receiving unit 1100 is configured to receive first information. The first information indicates a first modulation and coding scheme. The first modulation and coding scheme is one of N modulation and coding schemes. The N modulation and coding schemes include at least one modulation and coding scheme whose modulation order is 12. N is a positive integer. The processing unit 1200 is configured to receive or send data based on the first modulation and coding scheme. For the N modulation and coding schemes and the first information, refer to the description in the embodiment corresponding to FIG. 2. Details are not described herein again.

In another possible implementation, the receiving unit 1100 is configured to receive first signaling. The first signaling is used to configure N modulation and coding schemes. N is a positive integer. The receiving unit 1100 is further configured to receive first information. The first information indicates a first modulation and coding scheme. The first modulation and coding scheme is one of the N modulation and coding schemes. The processing unit 1200 is configured to determine the first modulation and coding scheme based on the first information. For the N modulation and coding schemes, the first signaling, and the first information, refer to the description in the embodiment corresponding to FIG. 3. Details are not described herein again.

Optionally, the first signaling includes second information and third information. The second information indicates M modulation and coding schemes. The third information indicates L modulation and coding schemes. M and L are positive integers. The receiving unit 1200 is further configured to receive second signaling. The second signaling indicates a first modulation and coding scheme set. The first modulation and coding scheme set includes the L modulation and coding schemes, but does not include the M modulation and coding schemes. The processing unit 1200 is specifically configured to determine the first modulation and coding scheme based on the first signaling, the second signaling, and the first information.

Optionally, the processing unit 1200 is specifically configured to: determine the N modulation and coding schemes based on the first signaling and the second signaling, where the N modulation and coding schemes include a modulation and coding scheme other than the L modulation and coding schemes in the first modulation and coding scheme set and the M modulation and coding schemes, and determine the first modulation and coding scheme from the N modulation and coding schemes based on the first information.

Optionally, the communication apparatus 1000 further includes a sending unit 1300. The sending unit 1300 and the receiving unit 1100 may alternatively be integrated into a transceiver unit that has both a receiving function and a sending function. This is not limited herein.

Optionally, in an implementation in which the communication apparatus 1000 is the terminal device in the method embodiments, the sending unit 1300 may be a transmitter, and the receiving unit 1100 may be a receiver. The receiver and the transmitter may alternatively be integrated into a transceiver. The processing unit 1200 may be a processing apparatus.

A function of the processing apparatus may be implemented by hardware, or may be implemented by executing corresponding software by hardware. For example, the processing apparatus may include a memory and a processor. The memory is configured to store a computer program, and the processor reads and executes the computer program stored in the memory, so that the communication apparatus 1000 performs operations and/or processing performed by the terminal device in the method embodiments. Optionally, the processing apparatus may include only a processor, and the memory configured to store the computer program is located outside the processing apparatus. The processor is connected to the memory through a circuit/wire, to read and execute the computer program stored in the memory. For another example, the processing apparatus may be a chip or an integrated circuit.

Optionally, in an implementation in which the communication apparatus 1000 is a chip or an integrated circuit installed in the terminal device, the sending unit 1300 and the receiving unit 1100 may be a communication interface or an interface circuit. For example, the sending unit 1300 is an output interface or an output circuit, and the receiving unit 1100 is an input interface or an input circuit. The processing unit 1200 may be a processor or a microprocessor integrated on the chip or the integrated circuit. This is not limited herein.

In another possible design, the communication apparatus 1000 includes a processing unit 1200 and a sending unit 1300. The communication apparatus 1000 may implement a step or a procedure performed by the network device in the foregoing method embodiments. For example, the communication apparatus 1000 may be a network device, or may be a chip or a circuit configured in a network device. The sending unit 1300 is configured to perform a receiving-related operation of the network device in the foregoing method embodiments, and the processing unit 1200 is configured to perform a processing-related operation of the network device in the foregoing method embodiments.

In a possible implementation, the processing unit 1200 is configured to determine a first modulation and coding scheme from N modulation and coding schemes. The N modulation and coding schemes include at least one modulation and coding scheme whose modulation order is 12. N is a positive integer. The sending unit 1300 is configured to send first information. The first information indicates the first modulation and coding scheme. For the N modulation and coding schemes and the first information, refer to the description in the embodiment corresponding to FIG. 2. Details are not described herein again.

Optionally, the communication apparatus 1000 may further include the processing unit 1200. The sending unit 1300 and the receiving unit 1100 may be integrated into the transceiver unit that has both the receiving function and the sending function. This is not limited herein.

In another possible implementation, the sending unit 1300 is configured to send first signaling. The first signaling is used to configure N modulation and coding schemes. N is a positive integer. The sending unit 1300 is further configured to send first information. The first information indicates a first modulation and coding scheme in the N modulation and coding schemes. For the N modulation and coding schemes, the first signaling, and the first information, refer to the description in the embodiment corresponding to FIG. 3. Details are not described herein again.

Optionally, the first signaling includes second information and third information. The second information indicates M modulation and coding schemes. The third information indicates L modulation and coding schemes. The sending unit 1300 is further configured to send second signaling. The second signaling indicates a first modulation and coding scheme set. The first modulation and coding scheme set includes the L modulation and coding schemes, but does not include the M modulation and coding schemes. M and L are natural numbers.

Optionally, the communication apparatus 1000 further includes the receiving unit 1100. The sending unit 1300 and the receiving unit 1100 may alternatively be integrated into the transceiver unit that has both the receiving function and the sending function. This is not limited herein.

Optionally, in an implementation in which the communication apparatus 1000 is the network device in the method embodiments, the sending unit 1300 may be a transmitter, and the receiving unit 1100 may be a receiver. The receiver and the transmitter may alternatively be integrated into a transceiver. The processing unit 1200 may be a processing apparatus.

A function of the processing apparatus may be implemented by hardware, or may be implemented by executing corresponding software by hardware. For example, the processing apparatus may include a memory and a processor. The memory is configured to store a computer program, and the processor reads and executes the computer program stored in the memory, so that the communication apparatus 1000 performs operations and/or processing performed by the network device in the method embodiments. Optionally, the processing apparatus may include only a processor, and the memory configured to store the computer program is located outside the processing apparatus. The processor is connected to the memory through a circuit/wire, to read and execute the computer program stored in the memory. For another example, the processing apparatus may be a chip or an integrated circuit.

Optionally, in an implementation in which the communication apparatus 1000 is a chip or an integrated circuit installed in the network device, the sending unit 1300 and the receiving unit 1100 may be a communication interface or an interface circuit. For example, the sending unit 1300 is an output interface or an output circuit, and the receiving unit 1100 is an input interface or an input circuit. The processing unit 1200 may be a processor or a microprocessor integrated on the chip or the integrated circuit. This is not limited herein.

Figure 5:
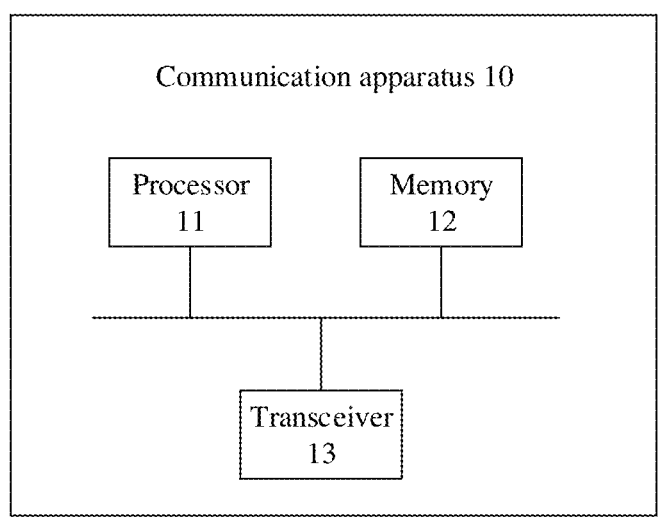
FIG. 5 is a schematic diagram of a structure of a communication apparatus 10 according to this disclosure.

FIG. 5 is a schematic diagram of a structure of a communication apparatus 10 according to this disclosure. The apparatus 10 includes a processor 11. The processor 11 is coupled to a memory 12. The memory 12 is configured to store a computer program or instructions and/or data. The processor 11 is configured to execute the computer program or the instruction stored in the memory 12, or read the data stored in the memory 12, to perform the methods in the foregoing method embodiments.

Optionally, there are one or more processors 11.

Optionally, there are one or more memories 12.

Optionally, the memory 12 and the processor 11 are integrated together, or are disposed separately.

Optionally, as shown in FIG. 5, the apparatus 10 further includes a transceiver 13. The transceiver 13 is configured to receive a signal and/or send a signal. For example, the processor 11 is configured to control the transceiver 13 to receive a signal and/or send a signal.

In a solution, the apparatus 10 is configured to implement operations performed by the terminal device in the foregoing method embodiments.

For example, the processor 11 is configured to execute the computer program or the instructions stored in the memory 12, to implement related operations performed by the terminal device in the foregoing method embodiments, for example, perform the method performed by the terminal device in the embodiment shown in FIG. 2 or FIG. 3.

In another solution, the apparatus 10 is configured to implement operations performed by the network device in the foregoing method embodiments.

For example, the processor 11 is configured to execute the computer program or the instructions stored in the memory 12, to implement related operations performed by the network device in the foregoing method embodiments, for example, perform the method performed by the network device in the embodiment shown in FIG. 2 or FIG. 3.

In addition, this disclosure further provides a computer-readable storage medium. The computer-readable storage medium stores computer instructions. When the computer instructions are run on a computer, an operation and/or a procedure performed by the terminal device or the network device in the method embodiments of this disclosure are/is performed.

This disclosure further provides a computer program product. The computer program product includes computer program code or instructions. When the computer program code or the instructions is/are run on a computer, an operation and/or a procedure performed by the terminal device or the network device in the method embodiments of this disclosure are/is performed.

In addition, this disclosure further provides a chip, and the chip includes a processor. A memory configured to store a computer program is disposed independently of the chip, and a processor is configured to execute the computer program stored in the memory, so that an operation and/or processing performed by the terminal device or the network device in any method embodiment are/is performed.

Further, the chip may include a communication interface. The communication interface may be an input/output interface, an interface circuit, or the like. Further, the chip may include the memory.

In addition, this disclosure further provides a wireless communication system, including the terminal device and the network device in embodiments of this disclosure.

It should be understood that a processor in embodiments of this disclosure may be an integrated circuit chip, and has a signal processing capability. In an implementation process, steps in the foregoing method embodiments can be implemented by using an integrated logical circuit of hardware in the processor, or by using instructions in a form of software. The processor may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The steps of the methods disclosed in embodiments of this disclosure may be directly presented as being performed and completed by a hardware encoding processor, or performed and completed by a combination of hardware and a software module in an encoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

A memory in embodiments of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should be further noted that, the memory described in this specification is intended to include, but is not limited to, these and any other suitable type of memory.

A person of ordinary skill in the art may be aware that, in combination with the examples described in embodiments disclosed in this specification, units and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this disclosure. It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments. In addition, functional units in embodiments of this disclosure may be integrated into one processing unit, each of the units may exist alone physically, or two or more units are integrated into one unit.

When the functions are implemented in a form of software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of software product. The software product is stored in a storage medium, and includes several instructions for indicating a computer device (which may be a personal computer, a server, a network device, or the like) to perform all or some of the steps of the methods described in embodiments of this disclosure. The foregoing storage medium includes any medium that can store program code, for example, a USB flash drive, a removable hard disk, a ROM, a RAM, a magnetic disk, or an optical disc.

It should be understood that, an "embodiment" mentioned throughout this specification means that particular features, structures, or characteristics related to this embodiment are included in at least one embodiment of this disclosure. Therefore, embodiments in the entire specification do not necessarily refer to a same embodiment. In addition, these particular features, structures, or characteristics may be combined in one or more embodiments in any appropriate manner.

It should be further understood that ordinal numerals such as "first" and "second" mentioned in embodiments of this disclosure are used to distinguish between a plurality of objects, and are not intended to limit sizes, content, a sequence, a time sequence, priorities, importance degrees, or the like of the plurality of objects. For example, first information and second information do not indicate a difference in an information amount, content, a priority, importance, or the like.

It should be further understood that, in this disclosure, both "when" and "if" mean that a network element performs corresponding processing in an objective situation, but do not constitute a limitation on time, do not require that the network element has a determining action during implementation, and do not mean other limitations either.

It should be further understood that, in this disclosure, "at least one" refers to one or more, and "a plurality of" refers to two or more. "At least one item (piece) of the following" or a similar expression thereof means any combination of these items, including any combination of singular items (pieces) or plural items (pieces). For example, at least one of a, b, or c may indicate a, b, c, a and b, a and c, b and c, or a, b, and c.

It should be further understood that, unless otherwise specified, an expression used in this disclosure similar to an expression that "an item includes one or more of the following: A, B, and C" usually means that the item may be any one of the following: A: B: C: A and B; A and C: B and C: A, B, and C: A and A: A, A, and A: A, A, and B: A, A, and C: A, B, and B: A, C, and C; B and B: B, B, and B: B, B, and C: C and C: C, C, and C; and another combination of A, B, and C. In the foregoing descriptions, three elements A, B, and C are used as an example to describe an optional case of the item. When an expression is "the item includes at least one of the following: A, B, . . . , and X", that is, more elements are included in the expression, a case to which the item is applicable may also be obtained according to the foregoing rule.

It should be understood that the term "and/or" in this specification describes only an association relationship between associated objects and indicates that three relationships may exist. For example, A and/or B may represent the following three cases: Only A exists, both A and B exist, and only B exists. A and B may be singular or plural. The character "/" generally indicates an "or" relationship between the associated objects. For example, A/B indicates A or B.

It should be further understood that in embodiments of this disclosure, "B corresponding to A" indicates that B is associated with A, and B may be determined based on A. However, it should be further understood that determining B based on A does not mean that B is determined based only on A. B may alternatively be determined based on A and/or other information.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method comprising:
   determining a first modulation and coding scheme from N modulation and coding schemes, wherein the N modulation and coding schemes comprise at least one modulation and coding scheme whose modulation order is 12, and N is a positive integer that is greater than 1; and
   sending first information, wherein the first information indicates the first modulation and coding scheme;
   wherein a quantity of the at least one modulation and coding scheme whose modulation order is 12 in the N modulation and coding schemes is 5 or 6; and
   wherein the quantity of the at least one modulation and coding scheme whose modulation order is 12 is 5, and the code rates corresponding to the five modulation and coding schemes whose modulation orders are 12 are 821.5/1024, 853/1024, 884.5/1024, 916.5/1024, and 948/1024; or
   the quantity of the at least one modulation and coding scheme whose modulation order is 12 is 6, and the code rates corresponding to the six modulation and coding schemes whose modulation orders are 12 are 816.5/1024, 842.5/1024, 869/1024, 895.5/1024, 921.5/1024, and 948/1024.

2. A communication method comprising:
   receiving first information, wherein the first information indicates a first modulation and coding scheme, the first modulation and coding scheme is one of N modulation and coding schemes, the N modulation and coding schemes comprise at least one modulation and coding scheme whose modulation order is 12, and N is a positive integer that is greater than 1; and
   receiving or sending data based on the first modulation and coding scheme;

wherein a quantity of the at least one modulation and coding scheme whose modulation order is 12 in the N modulation and coding schemes is 5 or 6;
wherein the quantity of the at least one modulation and coding scheme whose modulation order is 12 is 5, and the code rates corresponding to the five modulation and coding schemes whose modulation orders are 12 are 821.5/1024, 853/1024, 884.5/1024, 916.5/1024, and 948/1024; or
the quantity of the at least one modulation and coding scheme whose modulation order is 12 is 6, and the code rates corresponding to the six modulation and coding schemes whose modulation orders are 12 are 816.5/1024, 842.5/1024, 869/1024, 895.5/1024, 921.5/1024, and 948/1024.

3. The method according to claim 2, wherein each of the N modulation and coding schemes corresponds to one modulation order and one code rate.

4. The method according to claim 3, wherein the N modulation and coding schemes do not comprise a modulation and coding scheme whose modulation order is 2, or a quantity of modulation and coding schemes whose modulation orders are 2 in the N modulation and coding schemes is 1.

5. The method according to claim 4, wherein the quantity of modulation and coding schemes whose modulation orders are 2 in the N modulation and coding schemes is 1, and a code rate corresponding to the modulation and coding scheme whose modulation order is 2 is 120/1024 or 193/1024.

6. The method according to claim 2, wherein the N modulation and coding schemes do not comprise a modulation and coding scheme whose modulation order is 4, or a quantity of modulation and coding schemes whose modulation orders are 4 in the N modulation and coding schemes is 1.

7. The method according to claim 6, wherein the quantity of modulation and coding schemes whose modulation orders are 4 in the N modulation and coding schemes is 1, and a code rate corresponding to the modulation and coding scheme whose modulation order is 4 is 378/1024 or 490/1024.

8. The method according to claim 2, wherein the N modulation and coding schemes further comprise at least one modulation and coding scheme in a first modulation and coding scheme set and/or at least one modulation and coding scheme in a second modulation and coding scheme set, and a highest modulation order of the modulation and coding schemes in the first modulation and coding scheme set and the second modulation and coding scheme set is 6, 8, or 10.

9. An apparatus comprising:
one or more processors at least configured to:
receive first information, wherein the first information indicates a first modulation and coding scheme, the first modulation and coding scheme is one of N modulation and coding schemes, the N modulation and coding schemes comprise at least one modulation and coding scheme whose modulation order is 12, and N is a positive integer that is greater than 1; and
receive or send data based on the first modulation and coding scheme;
wherein a quantity of the at least one modulation and coding scheme whose modulation order is 12 in the N modulation and coding schemes is 5 or 6;
wherein the quantity of the at least one modulation and coding scheme whose modulation order is 12 is 5, and code rates corresponding to the five modulation and coding schemes whose modulation orders are 12 are 821.5/1024, 853/1024, 884.5/1024, 916.5/1024, and 948/1024; or
the quantity of the at least one modulation and coding scheme whose modulation order is 12 is 6, and code rates corresponding to the six modulation and coding schemes whose modulation orders are 12 are 816.5/1024, 842.5/1024, 869/1024, 895.5/1024, 921.5/1024, and 948/1024.

10. The apparatus according to claim 9, wherein each of the N modulation and coding schemes corresponds to one modulation order and one code rate.

11. The apparatus according to claim 10, wherein the N modulation and coding schemes do not comprise a modulation and coding scheme whose modulation order is 2, or a quantity of modulation and coding schemes whose modulation orders are 2 in the N modulation and coding schemes is 1.

12. The apparatus according to claim 11, wherein the quantity of modulation and coding schemes whose modulation orders are 2 in the N modulation and coding schemes is 1, and a code rate corresponding to the modulation and coding scheme whose modulation order is 2 is 120/1024 or 193/1024.

13. The apparatus according to claim 9, wherein the N modulation and coding schemes do not comprise a modulation and coding scheme whose modulation order is 4, or a quantity of modulation and coding schemes whose modulation orders are 4 in the N modulation and coding schemes is 1.

14. The apparatus according to claim 13, wherein the quantity of modulation and coding schemes whose modulation orders are 4 in the N modulation and coding schemes is 1, and a code rate corresponding to the modulation and coding scheme whose modulation order is 4 is 378/1024 or 490/1024.

* * * * *